(12) United States Patent
Solgi et al.

(10) Patent No.: US 10,679,390 B1
(45) Date of Patent: Jun. 9, 2020

(54) CONFIDENCE THRESHOLD DETERMINATION FOR MACHINE-LEARNED LABELING

(71) Applicant: Uber Technologies, Inc., San Francisco, CA (US)

(72) Inventors: Mojtaba Solgi, Sammamish, WA (US); Ankit Tandon, Sunnyvale, CA (US); Vasudev Parameswaran, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 995 days.

(21) Appl. No.: 15/214,302

(22) Filed: Jul. 19, 2016

(51) Int. Cl.
| | |
|---|---|
| *G06T 11/60* | (2006.01) |
| *G06N 7/00* | (2006.01) |
| *G06K 9/46* | (2006.01) |
| *G06K 9/62* | (2006.01) |
| *G06N 20/00* | (2019.01) |

(52) U.S. Cl.
CPC ............ *G06T 11/60* (2013.01); *G06K 9/4671* (2013.01); *G06K 9/6217* (2013.01); *G06N 7/005* (2013.01); *G06N 20/00* (2019.01)

(58) Field of Classification Search
CPC ........ G06T 11/60; G06N 20/00; G06N 7/005; G06K 9/4671; G06K 9/6217
See application file for complete search history.

(56) References Cited

U.S. PATENT DOCUMENTS

| | | | |
|---|---|---|---|
| 2005/0216426 A1* | 9/2005 | Weston ................ | G06K 9/6215 706/12 |
| 2006/0206443 A1* | 9/2006 | Forman ................ | G06K 9/6217 706/20 |
| 2015/0242761 A1* | 8/2015 | Amershi ............ | G06K 9/00536 706/11 |
| 2016/0070977 A1* | 3/2016 | Schimitzek ........ | H04N 5/23229 382/110 |

OTHER PUBLICATIONS

Hu, Shaohan, et al. "Smartroad: Smartphone-based crowd sensing for traffic regulator detection and identification." ACM Transactions on Sensor Networks (TOSN) 11.4 (2015): 55. (Year: 2015).*

* cited by examiner

*Primary Examiner* — Eric Nilsson
(74) *Attorney, Agent, or Firm* — Fenwick & West LLP

(57) ABSTRACT

A map labeling system trains a machine-learned model using a set of training data and generates a set of test predictions for a set of test properties by applying the machine-learned model to a set of testing data. Each prediction in the set of test predictions comprises a confidence score representing the machine-learned model's confidence in the prediction. The map labeling system determines a correctness of each prediction in the set of predictions and determines a relationship between the confidence scores and the correctness of the test predictions. The map labeling system establishes a confidence threshold for the machine-learned model based on the determined relationship and labels a production property by applying the machine-learned model to production data.

17 Claims, 6 Drawing Sheets

US 10,679,390 B1

CONFIDENCE THRESHOLD DETERMINATION FOR MACHINE-LEARNED LABELING

BACKGROUND

1. Field of Art

This disclosure relates generally to machine learning using one or more computer systems and more particularly to balancing efficiency and accuracy in systems using machine-learning.

2. Description of Art

Computerized travel coordination systems provide a means of travel by connecting users who need rides (i.e., "riders") with users who can drive them (i.e., "providers"). A rider can submit a request for a ride to the travel coordination system and the travel coordination system selects a provider to service the request by transporting the rider to the intended destination.

A travel coordination system can store maps of geographic regions in which the travel coordination system provides its services. The travel coordination system may also store properties of the map that provide details about particular segments of the map. For example, the travel coordination system may store the speed limit of a road segment in a stored map. However, while determining map properties can be crucial to the needs of the travel coordination system, map property labeling can be difficult to do efficiently and accurately, often requiring significant computing resources to perform. For example, humans can manually label map data, but this process can be slow and expensive.

SUMMARY

The above and other needs are met by methods, computer-readable storage media, and systems for establishing a confidence threshold for a machine-learned system, like a map labeling system.

One aspect provides a computer-implemented method for establishing a confidence threshold for a machine-learned system, like a map labeling system. The method includes training a machine-learned model using a set of training data and generating a set of test predictions for a set of test properties by applying the machine-learned model to a set of testing data. Each prediction in the set of test predictions can include or correspond to a confidence score. The method also includes determining a correctness of each prediction in the set of test predictions, determining a relationship between the confidence scores and the correctness of the test predictions, establishing a confidence threshold for the machine-learned model based on the determined relationship, and labeling a production property by applying the machine-learned model to production data responsive to the established confidence threshold.

Another aspect provides a non-transitory computer-readable storage medium storing executable computer program instructions for establishing a confidence threshold for a machine-learned system, like a map labeling system. The computer-readable storage medium stores computer program instructions for training a machine-learned model using a set of training data, generating a set of test predictions for a set of test properties by applying the machine-learned model to a set of testing data (where each prediction in the set of test predictions includes or corresponds to a confidence score), determining a correctness of each prediction in the set of test predictions, determining a relationship between the confidence scores and the correctness of the test predictions, establishing a confidence threshold for the machine-learned model based on the determined relationship, and labeling a production property by applying the machine-learned model to production data responsive to the established confidence threshold.

Still another aspect provides a system for establishing a confidence threshold for a machine-learned system, like a map labeling system. The system includes a non-transitory computer-readable storage medium storing executable computer program instructions for training a machine-learned model using a set of training data, generating a set of test predictions for a set of test properties by applying the machine-learned model to a set of testing data (where each prediction in the set of test predictions includes or corresponds to a confidence score), determining a correctness of each prediction in the set of test predictions, determining a relationship between the confidence scores and the correctness of the test predictions, establishing a confidence threshold for the machine-learned model based on the determined relationship, and labeling a production property by applying the machine-learned model to production data responsive to the established confidence threshold.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a system environment for a travel coordination system and a map labeling system, in accordance with some embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

The present disclosure relates to a travel coordination system that uses a confidence threshold for labeling map properties based on the threshold's relationship with a success rate and an error tolerance. The travel coordination system stores maps of geographic regions in which the travel coordination system matches riders with providers. These maps can include map properties that provide details about portions of the maps that can be important for the travel coordination system. For example, if the travel coordination system uses the maps to generate routing instructions for providers, map properties like the speed limit and directionality of road segments may be required to determine the optimal routing instructions for the provider.

A travel coordination system may use a map labeling system to automatically label map properties based on a confidence threshold for predictions. A confidence threshold is a threshold for the map labeling system's confidence in a prediction that can be used to determine whether to label a map property with the prediction. To ensure that the map labeling system labels the map properties efficiently without making incorrect predictions at a rate that surpasses an error tolerance, the map labeling system generates a relationship between the confidence threshold, the rate at which predictions meet the confidence threshold (i.e., "success rate"), and a given error tolerance. Thus, the map labeling system can establish an optimal confidence threshold with an optimal success rate and error tolerance.

Example Travel Coordination System Environment

Figure 1:
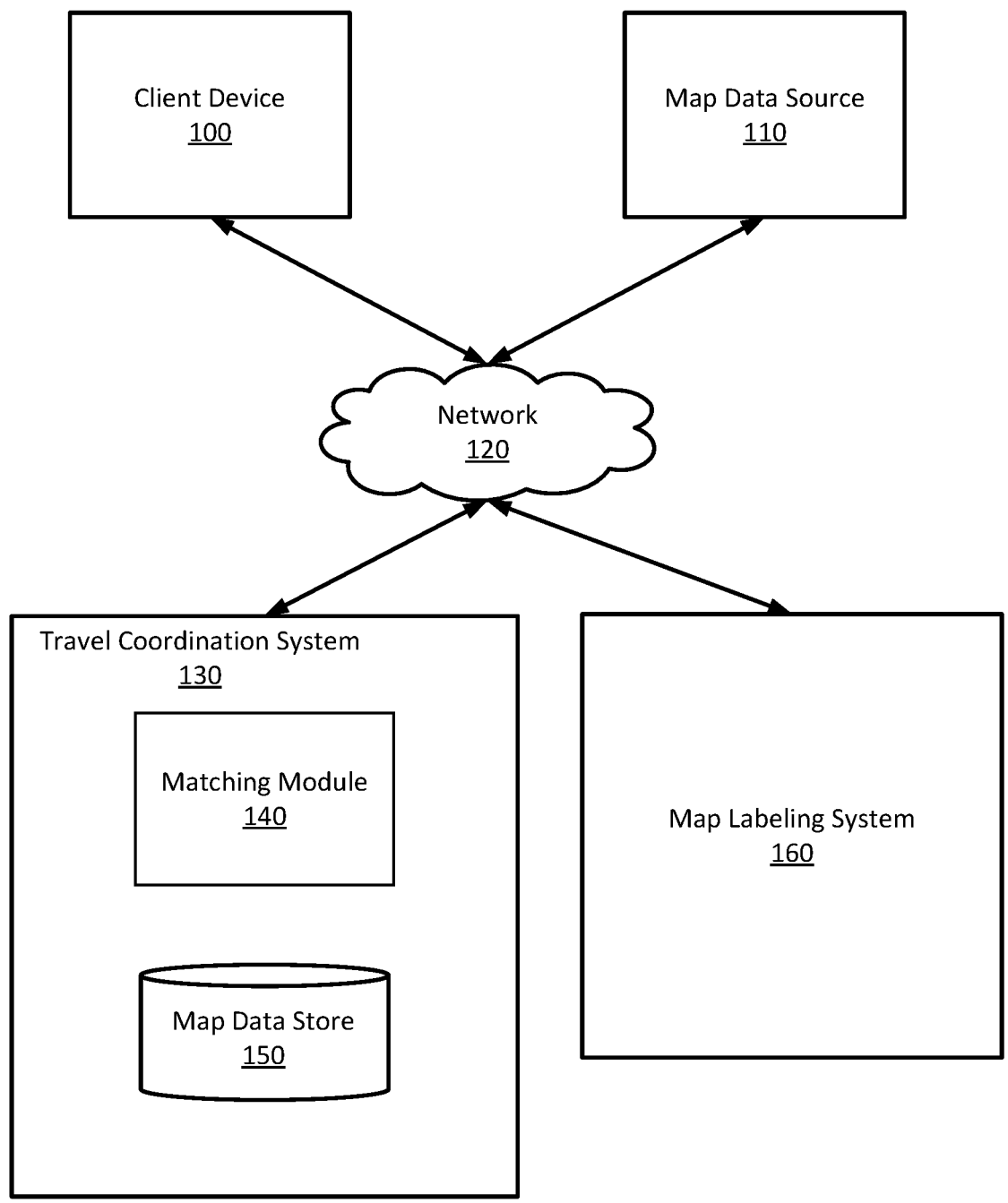

Figure (FIG. 1 is a high-level block diagram of a system environment for a travel coordination system 130, in accordance with some embodiments. FIG. 1 includes a client device 100, a map data source 110, a network 120, the travel coordination system 130, and a map labeling system 160. Only one client device 100 and map data source 110 are shown to simplify and clarify the description, however, alternate embodiments of the system environment can have many client devices 100 or map data sources 110, as well as multiple travel coordination and map labeling systems. The functions performed by the various entities of FIG. 1 may differ in different embodiments.

A user can interact with the travel coordination system 130 through a client device 100 to request transportation or to receive requests to provide transportation. As described herein, a client device 100 can be a personal or mobile computing device, such as a smartphone, a tablet, or a notebook computer. In some embodiments, the personal computing device executes a client application that uses an application programming interface (API) to communicate with the travel coordination system 130 through the network (s) 120.

Through operation of the client device 100, a user who is a rider can make a trip request to the travel coordination system 130. According to an example, a trip request can include user identification information, the number of passengers for the trip, a requested type of the provider (e.g., a vehicle type or service option identifier), the current location and/or the pickup location (e.g., a user-specific location, or a current location of the client device 100), and/or the destination for the trip. The current location of the client device 100 may be designated by the rider, or detected using a location sensor of the client device 100 (e.g., a global positioning system (GPS) receiver).

A user who is a provider can use the client device 100 to interact with the travel coordination system 130 to identify riders to whom the provider can provide transportation. In some embodiments, the provider is a person operating a vehicle capable of transporting passengers. In some embodiments, the provider is an autonomous vehicle that receives routing instructions from the travel coordination system 130. For convenience, this disclosure generally uses a car with a driver as an example provider. However, the embodiments described herein may be adapted for a provider operating alternative vehicles.

A provider can receive assignment requests through the client device 100. An assignment request identifiers a rider who submitted a trip request to the travel coordination system 130 and assigns the rider to the provider for a trip. For example, the travel coordination system 130 can receive a trip request from a client device 100 of a rider, select a provider from a pool of available (or "open") users to provide the trip, and transmit an assignment request to the selected user's client device 100. In some embodiments, a provider can indicate availability for receiving assignment requests. This availability may also be referred to herein as being "online" (available to receive assignment requests) or "offline" (unavailable to receive assignment requests). For example, a provider can decide to start receiving assignment requests by going online (e.g., by launching a client application or providing input on the client application to indicate that the provider wants to receive invitations), and stop receiving assignment requests by going offline. In some embodiments, when a client device 100 receives an assignment request, the provider has the option of accepting or rejecting the assignment request. By accepting the assignment request, the provider is assigned to the rider, and is provided the rider's trip details, such as pickup location and trip destination location. In one example, the rider's trip details are provided to the client device 100 as part of the invitation or assignment request.

In some embodiments, the travel coordination system 130 provides routing instructions to a provider through the client device 100 when the provider accepts an assignment request. The routing instructions can direct a provider from their current location to the location of the rider or can direct a provider to the rider's destination. The client device 100 can present the routing instructions to the provider in step-by-step instructions or can present the entire route at once.

The client device 100 may interact with the travel coordination system 130 through a client application configured to interact with the travel coordination system. The client application of the client device 100 can present information received from the travel coordination system 130 on a user interface, such as a map of the geographic region, and the current location of the client device 100. The client application running on the client device 100 can determine the current location and provide the current location to the travel coordination system 130.

In some embodiments, the client device 100 can be used by an administrator to develop or maintain the travel coordination system 130 or the map labeling system 160. The travel coordination system 130 and the map labeling system 160 may send information on the state of each system to the client device 100 to be presented to the administrator, such as diagnostic information and status updates. The administrator also can use the client device 100 to send instructions to the travel coordination system 130 and the map labeling system 160, including software to be executed by the systems or updated settings.

The map data source 110 collects and sends map data to the travel coordination system 130 and the map labeling system 160. Map data is data about a geographic region that can be used by the map labeling system 160 to generate and label a map of the geographic region for the travel coordination system 130. In some embodiments, the map data includes GPS data, such as positioning data of riders, providers, roads, and landmarks. The map data also may include image data or video data of roads, road signs, road surroundings, and landmarks. Additionally, the map data can include data about the current state of the geographic region, such as data about traffic, construction, road closures, and events. In some embodiments, the map data source 110 is a third-party system that sends the map data to the map labeling system 160. The map data source 110 may also be a client device 100 of a rider or a provider.

The client device 100 and map data source 110 can communicate with the travel coordination system 130 and the map labeling system 160 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

As described above, the travel coordination system 130 matches riders requesting transportation with providers that can transport the riders from their pick up location to their destination. The travel coordination system 130 can store maps of geographic regions in which the travel coordination system 130 services riders and providers, and may provide information about these maps to riders and providers through the client device 100. For example, the travel coordination system 130 may provide routing directions to the provider to pick up the rider and transport the rider to their destination. In some embodiments, the travel coordination system 130 uses a map labeling system 160 to label map properties on the maps.

The travel coordination system 130 illustrated in the example of FIG. 1 includes a matching module 140 and a map data store 150. Conventional components such as web servers, network interfaces, security functions, load balancers, failover servers, management and network operations consoles, and the like are not shown so as to not obscure the details of the system architecture. Additionally, the travel coordination system 130 may contain more, fewer, or different components than those shown in FIG. 1. In the example shown in FIG. 1, the travel coordination system 130 is separate from the map labeling system 160, however, in other embodiments, the map labeling system 160 is a component of the travel coordination system 130. Furthermore, while examples described herein relate to a transportation service, the travel coordination system 130 can enable other services to be requested by requesters, such as a delivery service, food service, entertainment service, etc., in which a provider is to travel to a particular location.

The matching module 140 selects providers to service the trip requests of riders. The matching module 140 receives a trip request from a rider and determines a set of candidate providers that are online, open (i.e., are available to transport a rider), and near the requested pickup location for the rider. The matching module 140 selects a provider from the set of candidate providers to which it transmits an assignment request. The provider can be selected based on the provider's location, the rider's pickup location, the type of the provider, the amount of time the provider has been waiting for an assignment request and/or the destination of the trip, among other factors. In some embodiments, the matching module 140 selects the provider who is closest to the pickup location or would take the least amount of time to travel to the pickup location. The matching module 140 sends an assignment request to the selected provider. If the provider accepts the assignment request, then the matching module 140 assigns the provider to the rider. If the provider rejects the assignment request, then the matching module 140 selects a new provider and sends an assignment request to the client device 100 for that provider.

The map data store 150 stores maps of geographic regions in which the travel coordination system 130 offers trip coordination services. The maps contain information about roads within the geographic regions. For the purposes of this disclosure, roads can include any route between two places that allows travel by foot, motor vehicle, bicycle, or other form of travel. Examples of roads include streets, highways, freeways, trails, bridges, tunnels, toll roads, or crossings. Roads may be restricted to certain users, or may be available for public use. Roads can connect to other roads in intersections. An intersection is a section of one or more roads that allows a user to travel from one road to another. Roads are divided into road segments, where road segments are portions of roads that are uninterrupted by intersections with other roads. For example, a road segment would extend between two adjacent intersections on a surface street or between two adjacent entrances/exits on a highway.

A map of a geographic region may be represented using a graph of the road segments. In some embodiments, the nodes of a graph of a map are road segments and edges between road segments represent intersections of road segments. In some embodiments, nodes of the map graph represent intersections between road segments and edges represent the road segments themselves. The map data store 150 also stores properties of the map, which may be stored in association with nodes or edges of a graph representing the map. Map properties can include road properties that describe characteristics of the road segments, such as speed limits, road directionality (e.g., one-way, two-way), traffic history/conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties.

The map labeling system 160 labels map properties of maps of geographic regions stored in the map data store 150. The map labeling system 160 generates machine-learned labeling models using training data containing verified map properties. The map labeling system 160 tests the accuracy of the labeling models using testing data and, based on the testing, determines a relationship between the confidence threshold for the labeling models, the success rate, and the error tolerance. The map labeling system 160 can establish a confidence threshold based on the relationship between the confidence threshold, success rate, and error tolerance to ensure that the map labeling system 160 balances its efficiency and accuracy of making predictions. In some embodiments, the confidence threshold is established by an administrator of the map labeling system 160 based on the relationship between the confidence threshold, success rate, and error tolerance.

Thus, the travel coordination system 130 can use the map labeling system 160 to label map properties for maps of geographic regions within which the travel coordination system 130 services users. The map labeling system 160 can receive map data from the client device 100 or the map data source 110 and use the map data to generate and train labeling models. The map labeling system 160 can determine the relationship between the confidence threshold, threshold success rate, and the error tolerance, and can establish a confidence threshold for the labeling models based on that relationship. The map labeling system 160 can use the labeling models to label map properties for the maps in the map data store 150. The travel coordination system 130 can then use the labeled maps in the map data store 150 to match riders with providers and to provide map information to users.

While the methods and systems described herein are described in the context of labeling of map properties, these methods and systems can be used more generally for any purpose where one would need to determine a confidence threshold for predictions made by a machine-learned model. For example, a machine-learned model for making predictions can be trained on a set of training data received from one or more data sources. A set of predictions may be generated by applying the machine-learned model to a set of testing data. As described herein, the predictions can be associated with confidence scores that reflect the machine-learned model's confidence in the prediction. The correctness of each prediction can be determined and a relationship between the confidence threshold, success rate, and error tolerance can be determined. Based on this relationship, the confidence threshold may be established and predictions may be made using the established confidence threshold.

Example Map Labeling System

Figure 2:
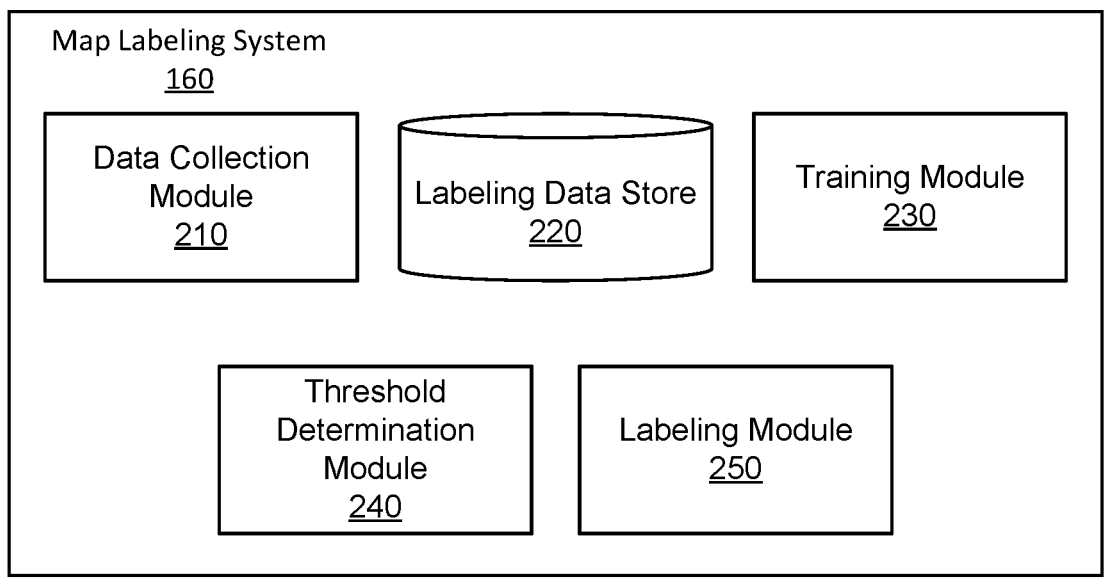
FIG. 2 is a high-level block diagram of a system architecture for a map labeling system, in accordance with some embodiments.

FIG. 2 is a high-level block diagram of a system architecture for a map labeling system 160, in accordance with some embodiments. FIG. 2 includes a data collection module 210, a labeling data store 220, a training module 230, a labeling module 240, and a threshold determination module 250. The map labeling system 160 may include additional, fewer, or different components from those in FIG. 2, and the functionality of the components as described herein may be distributed differently from the description herein.

The data collection module 210 collects map data from the map data sources 110. The data collection module 210 may receive map data from the map data sources 110 in batches or may receive a continuous stream of the map data. In some embodiments, the data collection module 210 actively retrieves the map data by requesting the map data from the map data sources 110.

The data collection module 210 may also process the map data as the map data is collected. In some embodiments, the data collection module 120 filters out map data that is not relevant to labeling map properties. For example, if the data collection module 210 receives an image of a road sign, but the road sign is illegible, the data collection module 210 may remove the image from the map data. The data collection module 210 can also reformat map data to be more easily used by the map labeling system 160. For example, the data collection module 210 may reformat the map data according to preset normalizing templates. The data collection module 210 may also extract features from the map data that describe the map data. Map data features can include statistical information about values within the map data, such as averages, standard deviations, medians, quartile/quintile/n-tile information, and ranges. Map data features also may include computed values that are determined based on one or more different pieces of map data. For example, the data collection module 210 may use a provider's GPS position and images of road markings to determine the direction the provider is traveling.

The labeling data store 220 stores labeling data used by the map labeling system 160 to label map properties. The labeling data can include data from other components of the map labeling system 160, such as the data collection module 210, the training module 230, the threshold determination module 240, and the labeling module 250, and can include map data, models, and prediction results. Labeling data in the labeling data store 220 can be used by the labeling module 250 to label map properties for maps in the map data store 150. In some embodiments, the labeling data is used as input data for machine-learned labeling models in the training module 230.

In one embodiment, the labeling data in labeling data store 220 include training data, testing data, and production data. All three of these types of data include data that the labeling models can use to predict map properties. The training and testing data include data indicating the true (also referred to as correct or verified) values of the associated map properties. For example, the training data and testing data may include speed limit input data (e.g., GPS data of providers and/or image data of road signs) for a set of road segments, and the correct speed limits for those road segments. In some embodiments, the training data and the testing data are designated portions of the same set of data in the labeling data store 220. The true values of the map properties for the production data are not known, and the values can be predicted using the models generated by the training module 230.

The training module 230 generates and trains labeling models for predicting map properties. In some embodiments, the labeling models are generated using supervised machine learning, wherein labeling models are trained using training data from the labeling data store 220. The training data can contain a set of correctly labeled map properties and labeling data that the labeling models can use to predict the map properties. For example, the training data may include images of street signs showing speed limits on road segments and the actual speed limits for the road segments so a speed-limit labeling model can learn to determine the speed limit of road segments based on images of street signs. In some embodiments, the labeling models are retrained as new labeling data is stored in the labeling data store 220. Examples of machine-learned models that can be used to generate the labeling models include decision trees, neural networks, deep learning, support vector machines, and Bayesian networks.

In addition to generating predictions for labeling map properties, the labeling models in the training module 230 generate confidence scores for the predictions that represent the labeling model's confidence in the accuracy of the predictions. In some embodiments, the confidence scores are numeric values that are computed by the labeling models. For example, the confidence score can be a value between and including 0 and 1, with increasing values representing increasing confidence that a prediction is correct. The confidence score for a prediction can be used to determine whether to label the map property with the prediction. The confidence score may be compared to a threshold and the corresponding prediction may only be used if the confidence score meets or exceeds the confidence threshold.

The threshold determination module 240 determines relationships between confidence thresholds, the rate at which predictions meet the confidence threshold (i.e., "success rate"), and error tolerances. By determining a relationship between a confidence threshold, a success rate, and an error rate, a confidence threshold for the labeling module 250 can be established that optimally balances the success rate and the error rate. Therefore, the computing resources of the map labeling system 160 are used efficiently.

In one embodiment, the threshold determination module 240 tests the labeling models generated by the training module 230 using testing data. The threshold determination module 240 applies the labeling models to the testing data and determines the correctness of the labeling models by comparing the true map properties in the testing data to the predictions generated by labeling models. As part of this testing, an embodiment of the threshold determination module 240 generates buckets for the predictions and assigns each prediction to a bucket based on the confidence score of the prediction. A bucket is a grouping of confidence scores that is defined based on the values of the confidence scores. Buckets may be generated for each possible confidence score, or buckets may be generated for ranges of confidence scores. For example, if the confidence scores range from 0.0 to 1.0, the threshold determination module 240 may establish buckets for confidence score ranges of 0.0 to 0.1, 0.1 to 0.2, 0.2 to 0.3, etc.

The threshold determination module 240 determines the number of correct and incorrect predictions in each bucket based on the verified map properties in the testing data. Then, an embodiment generates a distribution of the correctness of different confidence scores based on the buckets. In some embodiments, the threshold determination module 240 determines a correctness ratio for each bucket, where the correctness ratio describes the proportion of correct predictions to incorrect predictions within the bucket. The threshold determination module 240 uses the correctness distribution to generate a relationship between the error rate, the success rate, and the confidence threshold.

The threshold determination module 240 computes a function that describes the relationship between the confidence threshold and error tolerance, herein referred to as the "error-to-threshold function." The error-to-threshold function indicates the confidence threshold that will result in the map labeling system 160 achieving a given error tolerance. The error-to-threshold function is determined based on the number of correct and incorrect predictions in each bucket of confidence score ranges. In some embodiments, to determine the error-to-threshold function, the threshold determination module 240 computes an inverse error-to-threshold function that determines an error rate for a given confidence threshold. The inverse error-to-threshold function can be determined by dividing (i) the sum of incorrect predictions with confidence scores above the given confidence threshold by (ii) the sum of all predictions with confidence scores above the given confidence threshold. Thus, if $E(c_T)$ is function that determines an error rate E for a given confidence threshold $c_T$, then $$E(c_T) = \frac{\sum_{c \geq c_T} I(c)}{\sum_{c \geq c_T} (C(c) + I(c))}$$

where $I(c)$ is the number of incorrect predictions in the bucket containing a confidence score c and $C(c)$ is the number of correct predictions in the bucket containing confidence score c. In other words, the inverse error-to-threshold function $E(c_T)$ is equal to the sum of all the number of incorrect predictions $I(c)$ for confidence thresholds c greater than or equal to a given confidence threshold $c_T$, divided by the sum of the number of correct predictions $C(c)$ and incorrect predictions $I(c)$ for confidence thresholds c greater than or equal to the given confidence threshold $C_T$.

From $E(c_T)$, the threshold determination module 240 can determine the error-to-tolerance function by inverting $E(c_T)$ or, in other words, if the error-to-threshold function is $T(e)$, then, for some error tolerance e, $$T(e) = E^{-1}(e)$$

The threshold determination module 240 also computes a function that determines the success rate that can be achieved with a given error tolerance, herein referred to as the "error-to-success function." The error-to-success function is determined based on the number of correct and incorrect predictions in each bucket of confidence score ranges. In some embodiments, the threshold determination module 240 determines the error-to-success function using the error-to-threshold function. For example, the error-to-success function can use the error-to-threshold function to determine a threshold for the given error tolerance, and then can determine the number of predictions that met or exceeded the threshold to determine the success rate. In other embodiments, the threshold determination module 240 computes the error-to-success function directly from the number of correct and incorrect predictions in each bucket.

Using the error-to-threshold function and the error-to-success function, the travel coordination system 130 can determine a confidence threshold for the labeling module 250 based on an error tolerance and a success rate. In some embodiments, the administrator can use the error-to-success function to determine a desired balance between the error rate and the success rate. The optimal error tolerance is the error tolerance at which the map labeling system 160 achieves that balance between the optimal success rate for a corresponding confidence threshold and the optimal error tolerance. The threshold determination module 240 determines an optimal confidence threshold that corresponds to the optimal error tolerance using the error-to-threshold function and establishes that confidence threshold as the confidence threshold for labeling map properties in the labeling module 250.

Thus, the threshold determination module 240 uses the relationship between the confidence threshold, success rate, and error tolerance to establish an optimal confidence threshold for the labeling module 250. In some embodiments, the threshold determination module 240 establishes the optimal confidence threshold based on instructions from an administrator of the map labeling system 160. The labeling module 250 uses the optimal confidence threshold when labeling map properties, and thus ensures the maximum efficiency of the map labeling system 160 without erring at a rate that is greater than a specified error tolerance.

The labeling module 250 determines map properties using the labeling models generated by the training module 230 and the confidence threshold established by the threshold determination module 240. The labeling module 250 may identify production data in the labeling data store 220 that is relevant to making a prediction and apply the labeling models to the identified data. For example, if the labeling module 250 is labeling the directionality of a road segment, the labeling module 250 may identify images of the road segment and historical GPS data of providers on the road segment from the label data store 220, and may provide those images and GPS data into a labeling model in the training module 230 for determining road segment directionality. The labeling module 250 determines a prediction and confidence score using the labeling model and compares the confidence score to the confidence threshold established by the threshold determination module 240. If the confidence score of the prediction meets or exceeds the confidence threshold, the labeling module 250 labels the map property with the prediction from the training module 230. If the prediction confidence score is below the confidence threshold, the labeling module 250 does not label the map property with the prediction. Instead, the labeling module 250 may send the prediction to a team of humans for manual labeling, where humans manually review the relevant production data and label the map property. Manual labeling can be less efficient at labeling map properties than the labeling module 250, but may guarantee a more accurate map property. The labeling module 250 stores labeled map properties in the map data store 150.

Figure 3:
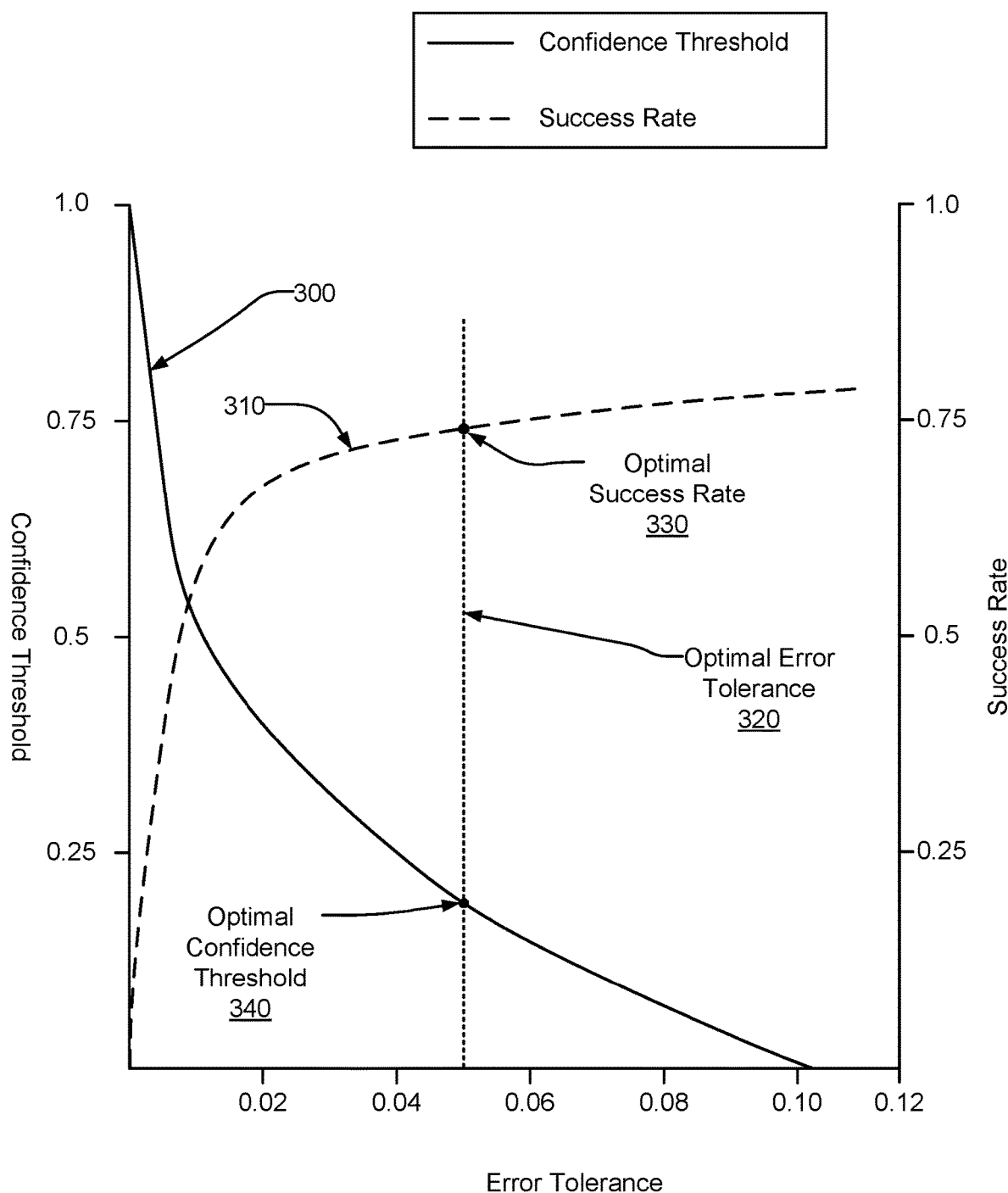
FIG. 3 illustrates an example of the relationship between the confidence threshold, success rate, and the error tolerance by graphing the confidence threshold and the success rate as functions of the error tolerance, in accordance with some embodiments.

FIG. 3 illustrates an example of the relationship between the confidence threshold, success rate, and the error tolerance by graphing the confidence threshold and the success rate as functions of the error tolerance, in accordance with some embodiments. The error tolerance is plotted on the horizontal axis, where a given error tolerance represents the proportion of incorrect predictions that exceed a confidence threshold. The confidence threshold is plotted on the left vertical axis. In the embodiment illustrated in FIG. 3, confidence scores range from 0.0 to 1.0. The graph illustrated in FIG. 3 includes a first curve 300 representing the relationship between the error tolerance and the confidence threshold. In some embodiments, the first curve 300 is plotted in accordance with the error-to-threshold function generated by the threshold determination module 250. The error tolerance and the confidence threshold are inversely proportional, since a greater error tolerance allows the map labeling system 130 to establish a lower confidence threshold, and vice versa.

The success rate is plotted on the right vertical axis, wherein a given success rate is a proportion of predictions that meet a confidence threshold. The graph illustrated in FIG. 3 includes a second curve 310 representing the relationship between the error tolerance and the success rate. In some embodiments, the second curve 310 is plotted in accordance with the error-to-success function generated by the threshold determination module 250.

As described above, the threshold determination module 250 can determine an optimal error tolerance 320 for the map labeling system 160. The map labeling system 160 can determine an optimal success rate 330 and an optimal success threshold 340 based on the optimal error tolerance 320 using the error-to-success function and the error-to-threshold function, respectively. The optimal confidence threshold 340 can then be established as the confidence threshold for the map labeling system 160. FIG. 3 illustrates the relationship between the optimal error tolerance, the optimal success rate, and the optimal confidence threshold.

Example Confidence Level Determination

Figure 4:
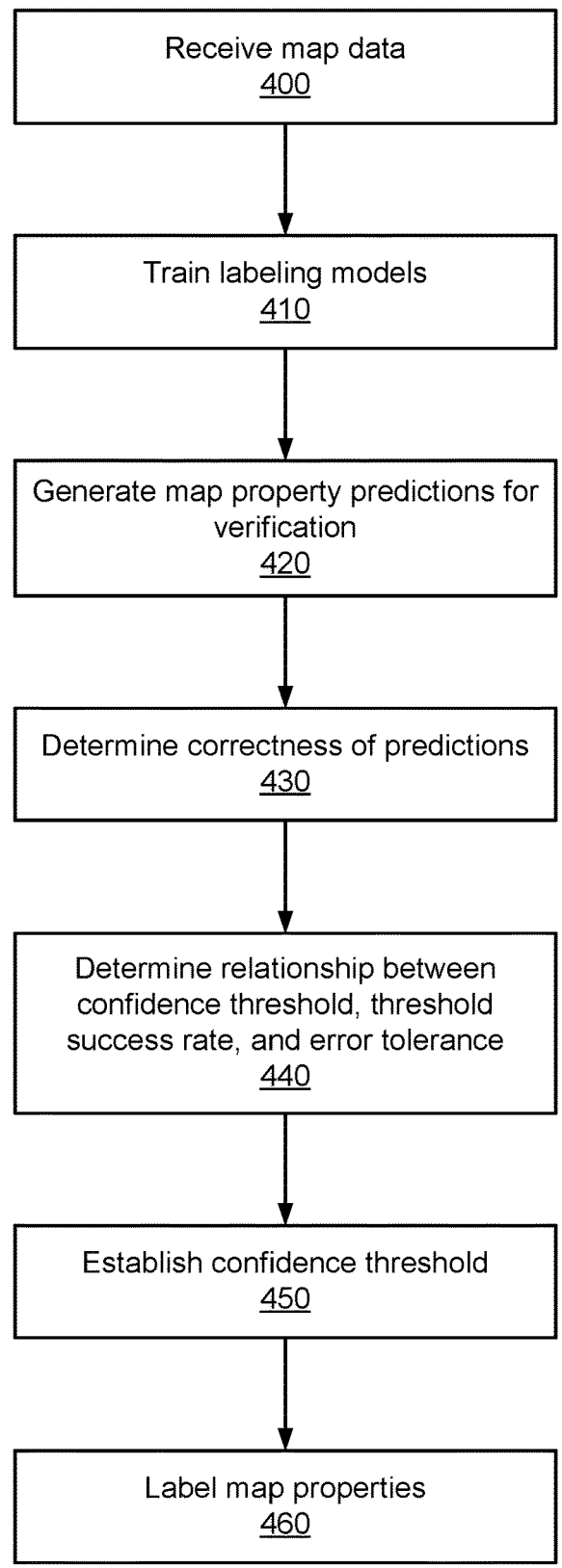
FIG. 4 is a flowchart for a method of establishing a confidence threshold for labeling map properties, in accordance with some embodiments.

FIG. 4 is a flowchart for a method of establishing a confidence threshold for labeling map properties, in accordance with some embodiments. Alternate embodiments to FIG. 4 may include more, fewer, or different steps, and the steps may be performed in an order different from what is illustrated in FIG. 4 and described herein.

The map labeling system 160 receives 400 map data from map data sources 110 and trains 410 labeling models based on the map data. The map labeling system uses supervised machine learning to train the labeling models, where the map data contains training data with verified map properties that the map labeling system 160 can use to train the labeling models. The map labeling system 160 generates 420 test predictions of test map properties using the trained labeling models by applying the trained labeling models to testing data within the map data. Each generated prediction includes a corresponding confidence score representing the labeling model's confidence in the prediction. The map labeling system 160 tests the accuracy of the labeling models by comparing the predictions of the test map properties to corresponding verified map properties in the testing data and determining 430 the correctness of the predictions.

To determine an optimal confidence threshold for the map labeling system 160, the map labeling system 160 determines 440 a relationship between the confidence threshold, the success rate, and the error tolerance. The relationship between the confidence threshold, success rate, and the error tolerance can include a function that determines a confidence threshold for a given error tolerance, and a function that determines a success rate for a given error tolerance. The map labeling system 160 establishes 450 a confidence threshold for labeling map properties based on the relationship between the confidence threshold, success rate, and error tolerance. The established confidence threshold is used by the map labeling system 160 to make production predictions that label 460 map properties based on production map data. For example, the confidence threshold may be used as a threshold that a confidence score for a prediction needs to meet or exceed for the prediction to be used to label a map property.

Example Hardware Architecture

Figure 5:
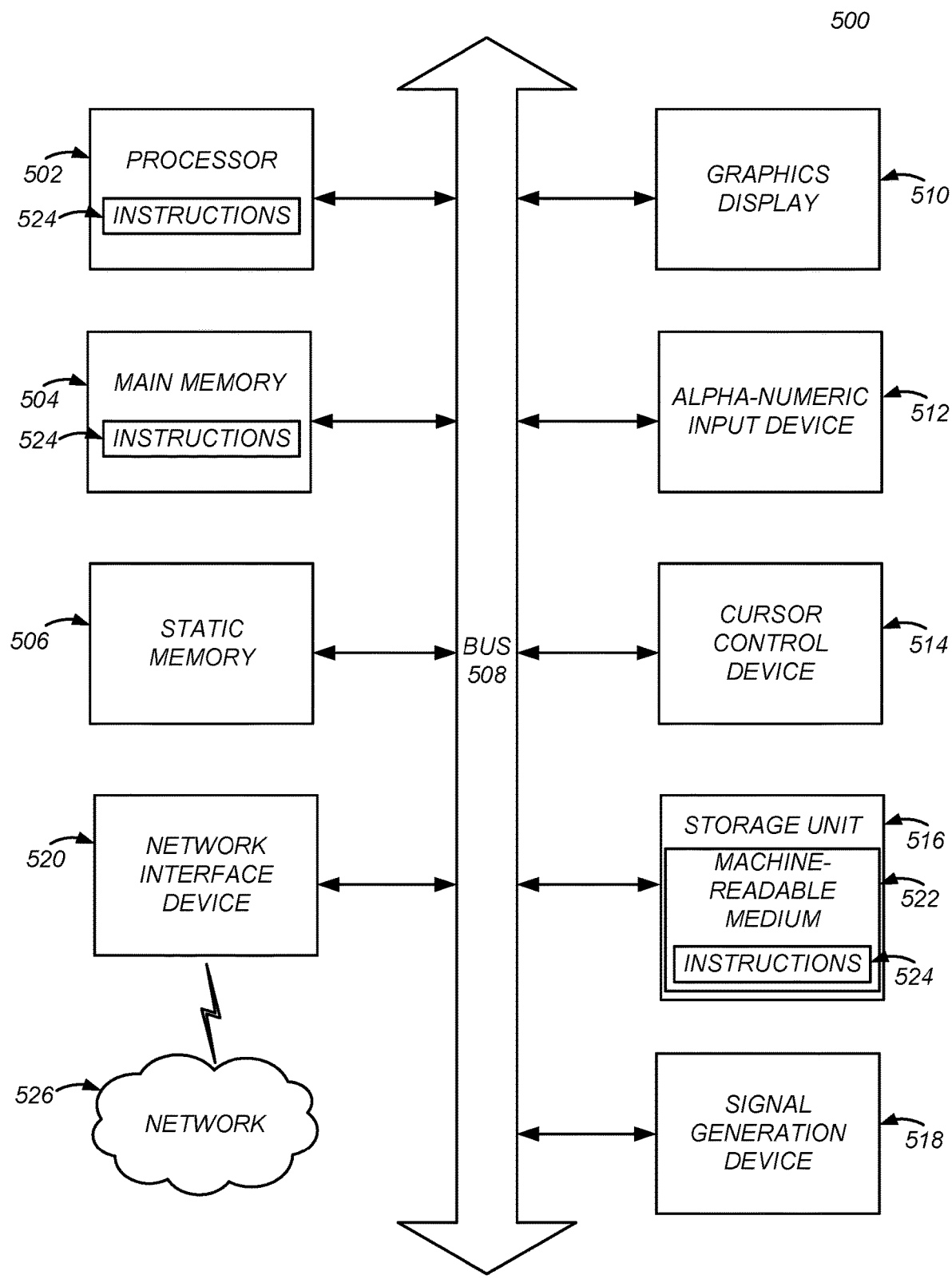
FIG. 5 illustrates an example hardware architecture of a computer system, such as a travel coordination system or a map labeling system, in accordance with some embodiments.

FIG. 5 illustrates an example hardware architecture of a computer system 500, such as a travel coordination system 130 or a map labeling system 160, in accordance with some embodiments. The illustrated computer system 500 includes a processor 502, a main memory 504, a static memory 506, a bus 508, a graphics display 510, an alpha-numeric input device 512, a cursor control device 514, a storage unity 516, a signal generation device 518, and a network interface device 520. In alternative configurations, additional, fewer, or different components may be included in computer system 500 than those described in FIG. 5.

The computer system 500 can be used to execute instructions 524 (e.g., program code or software) for causing the computer system 500 to perform any one or more of the methodologies (or processes) described herein. In alternative embodiments, the computer system 500 operates as a standalone device or a connected (e.g., networked) device that connects to other computer systems 500. In a networked deployment, the computer system 500 may operate in the capacity of a server machine.

The computer system 500 may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated in FIG. 5, the term "computer system" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Figure 6:
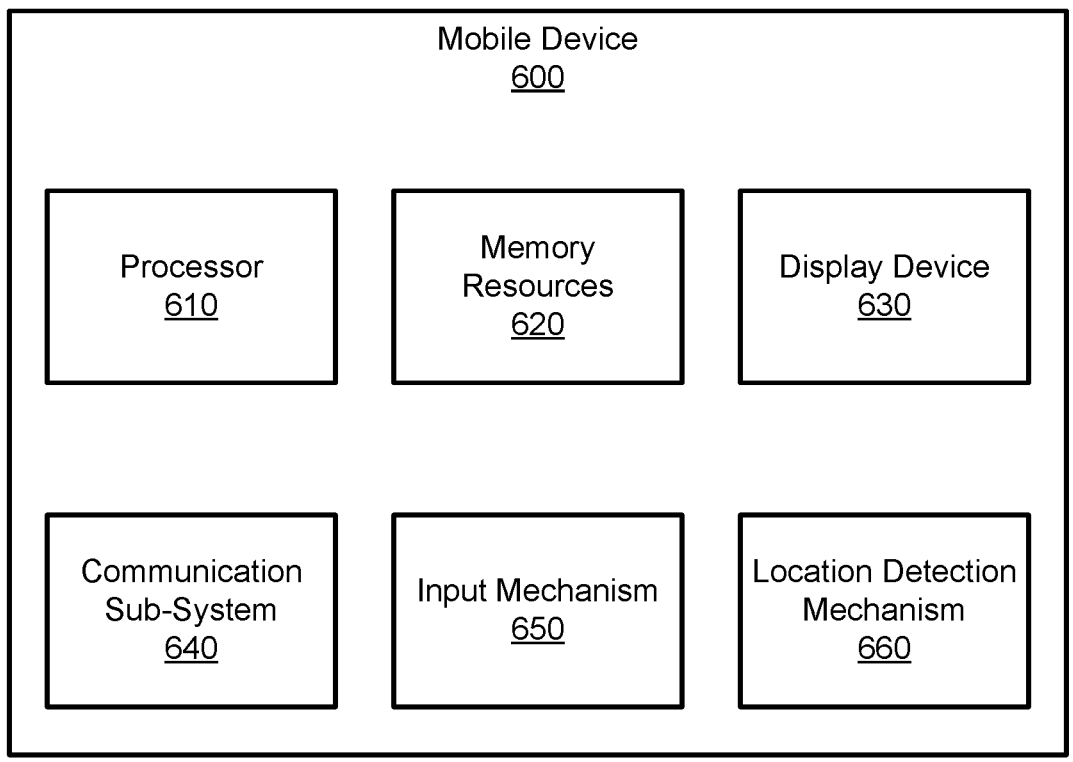
FIG. 6 illustrates an example hardware architecture of a mobile device, such as a client device, in accordance with some embodiments.

FIG. 6 illustrates a mobile computing device upon which examples described herein may be implemented. In one example, a mobile device 600 may correspond to a mobile computing device, such as a cellular device that is capable of telephony, messaging, and data services. The mobile device 600 can correspond to a client device 100. Examples of such devices include smartphones, handsets, or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 is configured with software and/or other logic to perform one or more processes, steps and other functions described herein. The processor 610 is configured, with instructions and data stored in the memory resources 620, to operate a client application Instructions for operating the client application in order to display various user interfaces can be stored in the memory resources 620 of the computing device 600.

The GPS component 660 can determine location information, such as the geographic location of the mobile device 600. The geographic location of the mobile device 600 can be wirelessly transmitted to the travel coordination system 130 via the communication subsystems 640 periodically or as part of ordinary communication with the travel coordination system 130. The travel coordination system 130 can receive the geographic location from the mobile device 600 (or a user-specific location data point corresponding to a selected pickup location) and can select a provider to service a trip request from a rider based on the geographic location. The travel coordination system 130 can also transmit a notification to the mobile device 600 via the communication sub-systems 640 if the trip price estimate is less than a target price set by the rider and the travel coordination system is able to service the trip request. The notification can be processed by the processor 610 to provide the notification as content as part of a user interface on the display 630.

For example, the processor 610 can provide a variety of content to the display 630 by executing instructions and/or applications that are stored in the memory resources 620. One or more user interfaces can be provided by the processor 610, such as a user interface for the service application. While FIG. 6 is illustrated for a mobile device, one or more examples may be implemented on other types of devices such as laptop and desktop computers.

Additional Configurations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses the labeling of map properties, the methods and systems herein can be used more generally for any purpose where one would want to determine a confidence threshold for predictions made by a machine-learned model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   training a machine-learned model using a set of training data;
   generating a set of test predictions for a set of test properties by applying the machine-learned model to a set of testing data, each prediction in the set of test predictions comprising a confidence score;
   determining a correctness of each prediction in the set of test predictions;
   determining a relationship between the confidence scores and the correctness of the test predictions;
   establishing a confidence threshold for the machine-learned model based on the determined relationship by:
      determining a confidence relationship between a candidate confidence threshold for the machine-learned model, a success rate indicating how often the candidate confidence threshold is met by confidence scores of predictions made by the model, and an error tolerance for the candidate confidence threshold, wherein the confidence threshold is determined based on the confidence relationship; and
   labeling a production property by applying the machine-learned model to production data responsive to the established confidence threshold.

2. The computer-implemented method of claim 1, wherein the training data comprises map data having verified map properties, the testing data comprises map data having verified map properties, and the production property is a property on a map.

3. The computer-implemented method of claim 2, wherein the map data comprises at least one of global positioning system (GPS) data, image data, video data, or data about a current state of a geographic area.

4. The computer-implemented method of claim 1, wherein determining a relationship between the confidence scores and the correctness of the test predictions comprises:

computing a first function based on the correctness of each prediction in the set of test predictions, the first function determining a confidence threshold based on a given error tolerance;
computing a second function based on the correctness of each prediction in the set of predictions, the second function determining a success rate based on a given error tolerance; and
determining the confidence relationship based on the first function and the second function.

5. The computer-implemented method of claim 1, wherein labeling the production property by applying the machine-learned model to production data responsive to the established confidence threshold comprises:
   comparing a confidence score for a candidate prediction generated based on the production data to the established confidence threshold; and
   labeling a property on a map using the candidate prediction responsive to the candidate prediction exceeding the established confidence threshold.

6. The computer-implemented method of claim 1, wherein establishing a confidence threshold for the machine-learned model based on the determined relationship comprises determining the confidence threshold using the determined relationship based on a specified error tolerance.

7. A non-transitory computer-readable storage medium storing executable computer program instructions, the computer program instructions comprising instructions for:
   training a machine-learned model using a set of training data;
   generating a set of test predictions for a set of test properties by applying the machine-learned model to a set of testing data, each prediction in the set of test predictions comprising a confidence score;
   determining a correctness of each prediction in the set of test predictions;
   determining a relationship between the confidence scores and the correctness of the test predictions;
   establishing a confidence threshold for the machine-learned model based on the determined relationship by:
      determining a confidence relationship between a candidate confidence threshold for the machine-learned model, a success rate indicating how often the candidate confidence threshold is met by confidence scores of predictions made by the model, and an error tolerance for the candidate confidence threshold, wherein the confidence threshold is determined based on the confidence relationship; and
   labeling a production property by applying the machine-learned model to production data responsive to the established confidence threshold.

8. The computer-readable storage medium of claim 7, wherein the training data comprises map data having verified map properties, the testing data comprises map data having verified map properties, and the production property is a property on a map.

9. The computer-readable storage medium of claim 8, wherein the map data comprises at least one of global positioning system (GPS) data, image data, video data, or data about a current state of a geographic area.

10. The computer-readable storage medium of claim 7, wherein the computer program instructions for determining a relationship between the confidence scores and the correctness of the test predictions comprise instructions for:

computing a first function based on the correctness of each prediction in the set of test predictions, the first function determining a confidence threshold based on a given error tolerance;

computing a second function based on the correctness of each prediction in the set of predictions, the second function determining a success rate based on a given error tolerance; and determining the confidence relationship based on the first function and the second function.

11. The computer-readable storage medium of claim 7, wherein the computer program instructions for labeling the production property by applying the machine-learned model to production data responsive to the established confidence threshold comprise instructions for:

comparing a confidence score for a candidate prediction generated based on the production data to the established confidence threshold; and labeling a property on a map using the candidate prediction responsive to the candidate prediction exceeding the established confidence threshold.

12. The computer-readable storage medium of claim 7, wherein the computer program instructions for establishing a confidence threshold for the machine-learned model based on the determined relationship comprise instructions for determining the confidence threshold using the determined relationship based on a specified error tolerance.

13. A computer system, comprising:
a non-transitory computer-readable storage medium storing executable computer program instructions for:
training a machine-learned model using a set of training data;
generating a set of test predictions for a set of test properties by applying the machine-learned model to a set of testing data, each prediction in the set of test predictions comprising a confidence score;
determining a correctness of each prediction in the set of test predictions;
determining a relationship between the confidence scores and the correctness of the test predictions;
establishing a confidence threshold for the machine-learned model based on the determined relationship by:
determining a confidence relationship between a candidate confidence threshold for the machine-learned model, a success rate indicating how often the candidate confidence threshold is met by confidence scores of predictions made by the model, and an error tolerance for the candidate confidence threshold, wherein the confidence threshold is determined based on the confidence relationship; and
labeling a production property by applying the machine-learned model to production data responsive to the established confidence threshold.

14. The system of claim 13, wherein the training data comprises map data having verified map properties, the testing data comprises map data having verified map properties, and the production property is a property on a map.

15. The system of claim 14, wherein the map data comprises at least one of global positioning system (GPS) data, image data, video data, or data about a current state of a geographic area.

16. The system of claim 13, wherein the computer program instructions for determining a relationship between the confidence scores and the correctness of the test predictions comprise instructions for:

computing a first function based on the correctness of each prediction in the set of test predictions, the first function determining a confidence threshold based on a given error tolerance;

computing a second function based on the correctness of each prediction in the set of predictions, the second function determining a success rate based on a given error tolerance; and determining the confidence relationship based on the first function and the second function.

17. The system of claim 13, wherein the computer program instructions for labeling the production property by applying the machine-learned model to production data responsive to the established confidence threshold comprise instructions for:

comparing a confidence score for a candidate prediction generated based on the production data to the established confidence threshold; and labeling a property on a map using the candidate prediction responsive to the candidate prediction exceeding the established confidence threshold.

* * * * *